US008219829B2

(12) United States Patent
Rudelic

(10) Patent No.: US 8,219,829 B2
(45) Date of Patent: Jul. 10, 2012

(54) SCHEME FOR SECURING LOCALLY GENERATED DATA WITH AUTHENTICATED WRITE OPERATIONS

(75) Inventor: John Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1979 days.

(21) Appl. No.: 11/298,045

(22) Filed: Dec. 8, 2005

(65) Prior Publication Data

US 2007/0136407 A1    Jun. 14, 2007

(51) Int. Cl.
*G06F 11/30* (2006.01)
(52) U.S. Cl. ........................................ 713/193; 713/170
(58) Field of Classification Search .................. 713/170, 713/193, 189; 709/223; 380/282; 726/26
See application file for complete search history.

(56) References Cited

U.S. PATENT DOCUMENTS

| | | | | |
|---|---|---|---|---|
| 4,910,774 A | * | 3/1990 | Barakat | 705/67 |
| 5,835,594 A | * | 11/1998 | Albrecht et al. | 713/187 |
| 5,867,577 A | * | 2/1999 | Patarin | 705/67 |
| 6,598,165 B1 | * | 7/2003 | Galasso | 713/189 |
| 7,194,619 B2 | * | 3/2007 | Abbondanzio et al. | 713/155 |
| 7,197,648 B2 | * | 3/2007 | Evans | 713/189 |
| 7,228,434 B2 | * | 6/2007 | Zisowski | 713/187 |
| 7,337,329 B2 | * | 2/2008 | Evans | 713/189 |
| 2003/0126245 A1 | * | 7/2003 | Feltin et al. | 709/223 |
| 2003/0188174 A1 | * | 10/2003 | Zisowski | 713/189 |
| 2004/0037121 A1 | * | 2/2004 | Shinriki et al. | 365/200 |
| 2005/0283618 A1 | * | 12/2005 | Min | 713/182 |
| 2006/0115081 A1 | * | 6/2006 | Buer et al. | 380/44 |

OTHER PUBLICATIONS

U.S. Appl. No. 11/188,254, filed Jul. 22, 2005—Method and Apparatus Capable of Disabling Authenticated Operations and Guaranteed Secure Boot in a Wireless Platform.
U.S. Appl. No. 11/130,759, filed May 17, 2005—Internally Authenticated Flash Remediation.
U.S. Appl. No. 11/237,306, filed Sep. 27, 2005—Secure Booting From a Memory Device.

* cited by examiner

*Primary Examiner* — Samson Lemma
(74) *Attorney, Agent, or Firm* — Trop, Pruner & Hu, P.C.

(57) ABSTRACT

A scheme for securing a locally generated data on a system using authenticated write operations is disclosed. According to an embodiment of the present invention, a private/public key pair is randomized and repeatedly generated to protect operations to data blocks.

16 Claims, 3 Drawing Sheets

SCHEME FOR SECURING LOCALLY GENERATED DATA WITH AUTHENTICATED WRITE OPERATIONS

BACKGROUND

Description of the Related Art

This invention relates generally to memory devices. Memory devices are used in many different types of systems to store software and data.

Many systems, such as handheld or portable devices, are vulnerable to attack from hackers, viruses, worms, and the like. Software and data stored in memory on a system are subject to various types of undesired modification due to one of these attacks. Because software is typically only modified during a system installation or a software upgrade, a system manufacture may put protections in place to eliminate the threat to software stored in system memory. However, important data, for example, file system data, is often generated locally, routinely updated, and thus vulnerable to undesired modification.

System designers are constantly looking for mechanisms to prevent hackers, viruses, worms, and the like from altering important data stored in a system memory.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

Figure 1:
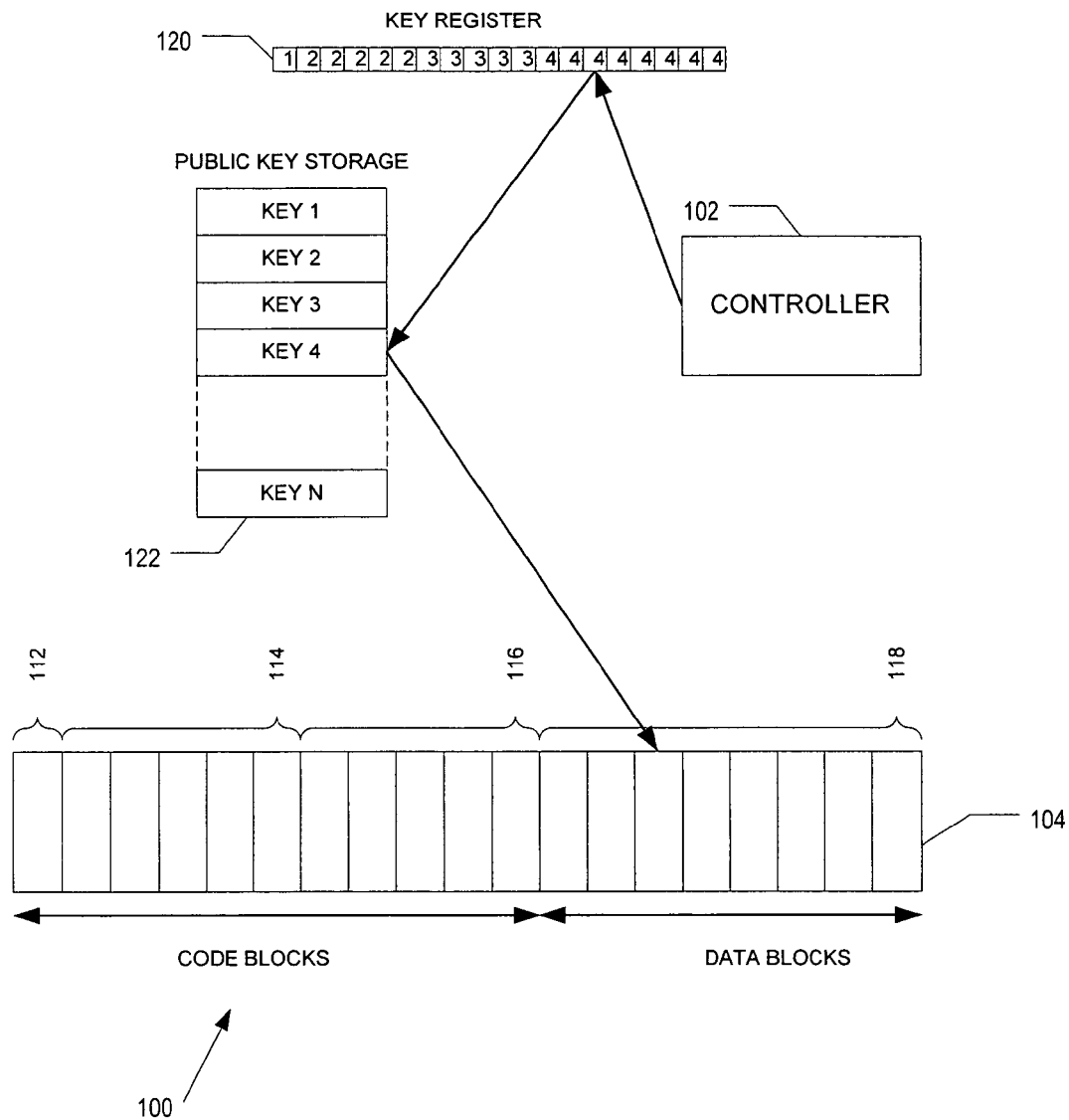
FIG. 1 illustrates a memory device according to an embodiment of the present invention.

FIG. 1 illustrates a memory device 100 according to an embodiment of the present invention. Memory device 100 may be a flash memory device. Flash memory is a type of memory that is non-volatile, that is, flash memory retains stored content without power. Memory device 100 may be any flash memory device that includes a controller such as the controller 102. For example, memory device 100 may be a NOR flash memory device which typically includes a controller, but may also be a NAND flash memory device that includes a controller, although controllers are not normally included in NAND flash memory devices. Controller 102 may be any controller including a microcontroller or a processor that runs general purpose commands.

Memory device 100 includes an array of memory cells 104 that store information. Array 104 is divided into multiple blocks. Some of the blocks are used for code storage, for example, boot block 112, operating system and system library blocks 114, carrier application blocks 116. Other blocks are used for data storage, for example, file system data blocks 118. Memory device 100 may include other blocks, not shown.

Memory device 100 utilizes controller 102 to perform authenticated write operations to the code and data blocks. Authenticated writes are program operations that include additional information that may used by controller 102 to authenticate the entity requesting the operation. The additional information may range from public/private asymmetric key cryptography to simple password protection. Memory device 100 will not perform the operation unless the authentication by controller 102 memory is successful. Authenticated operations, such as an authenticated program or erase operation, can prevent unwanted modification of data stored in the memory.

To implement authenticated operations to the code blocks and the data blocks, key register 120 and keys within public key storage 122 are used to verify any attempted operations. The authentication operation may be any authentication function, including one which operates under the RSA algorithm, invented in 1978 by Ron Rivest, Adi Shamir, and Leonard Adlemen, a symmetric key, or a password, to mention a few examples. RSA is a cryptographic algorithm that offers a high level of security for digital data transfers. RSA uses a public key and a private key and incorporates modular exponentiation mathematics. Modular exponentiation of large integers may be efficiently computed within the public key function by repeated modular multiplications. Pipelining techniques or repetitive multiplication cycles may be used for the massive parallel computations.

Public key storage 122 stores public keys that are used for authentication. While public key storage 122 is indicated to be a separate storage, it too may be part of memory array 104 in some embodiments. Key register 120 identifies which key stored in public key storage is to be used for each memory block. As illustrated, public keys 1-3 are used to verify code blocks 112, 114 and 116, respectively. Because updated software code typically comes from an external source such as a manufacture or software house, a private key is not stored on the local system. Public key 4 is used to verify data blocks 118. Because data is often generated locally on a system, the system must also have a private key. Because the private key must be stored locally within the system, data blocks 118 are vulnerable to attacks.

According to an embodiment of the present invention, the private/public key pair used to authenticate operations to data block 118 may be randomized, that is, the key pair may be generated to have a random, non-predicable value. According to another embodiment of the invention, the key pair may be generated each time the system powers up. Additionally or alternatively, the key pair may be repeatedly generated, at periodic or random time intervals, to impede hackers from discovering the private and public keys and generating unwanted operations. The key pair may be repeatedly generated at a rate that makes attacking the data blocks non-practical.

According to an embodiment of the present invention, multiple key pairs may be used to protect the data blocks, for example, one key pair for each data block or subset of data blocks.

Figure 2:
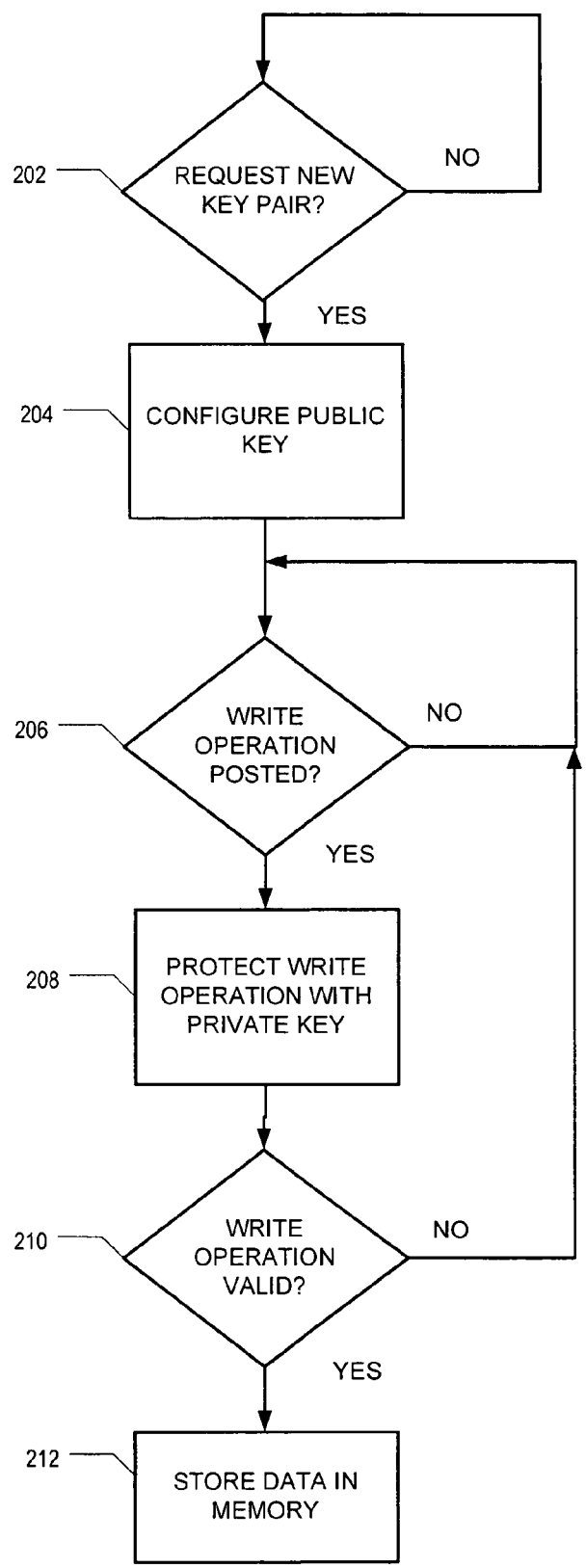
FIG. 2 illustrates a random key generation and usage flow diagram according to an embodiment of the present invention.

FIG. 2 illustrates a random key generation and usage flow diagram according to an embodiment of the present invention. The flow begins with request for a new key pair, block 202. For example, upon a system power up, a host processor may request that a flash file system initialize. An application programming interface (API) may internally initialize the file system by first initializing low level operating code. Flash low level operating code may request a new key pair from, for example, a key generation application executing on the host processor or a flash controller. Once generated, the public key is configured, block 204. For example, the flash low level operating code configures the public key for the blocks that that are managed by the file system. Configuring the public key may include, for example, storing the public key in public key storage 122 as key 4. After the public key is configured, a write operation may be attempted, block 206. For example, a write operation may be posted to the file system API. The write operation may be protected using the private key, block 208. For example, the core file system breaks the write request into the specific media operations to the flash memory. The write operation is authenticated with the public key, block 210. If authentication indicates the write operation is valid, data is stored in memory, block 212.

Figure 3:
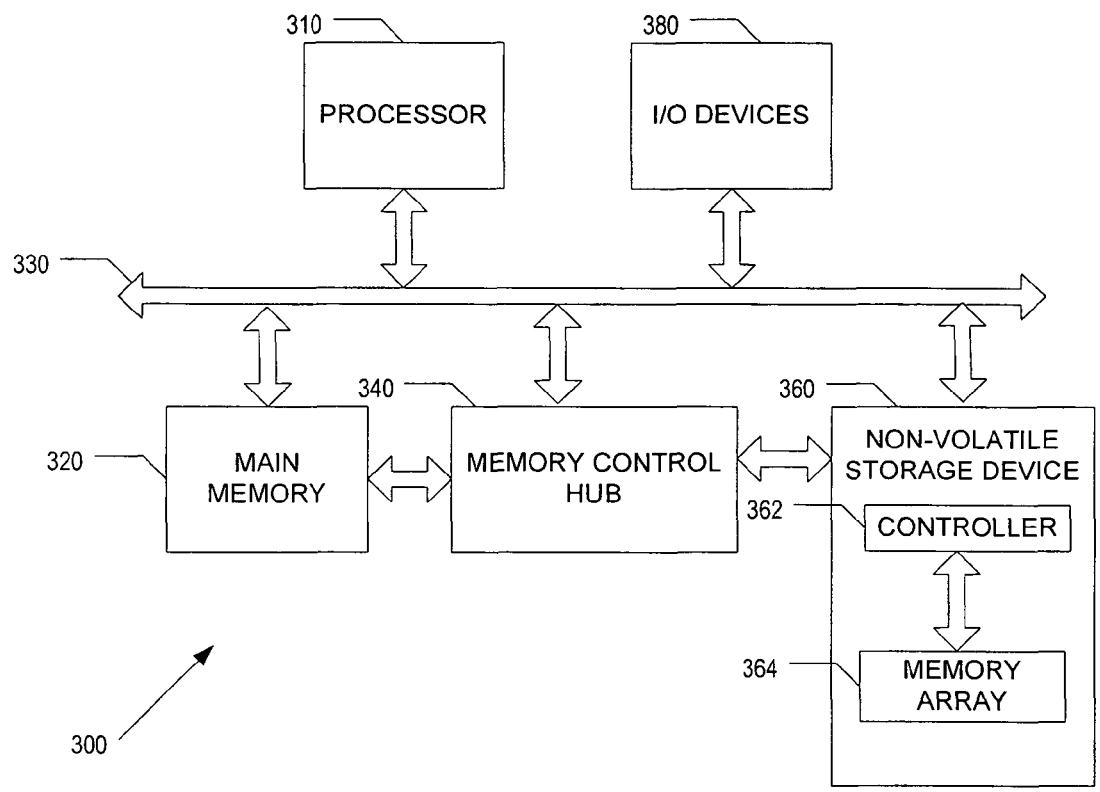
FIG. 3 illustrates a system utilizing authenticated write operations according to an embodiment of the present invention.

FIG. 3 illustrates a system utilizing authenticated write operations according to an embodiment of the present invention. System 300 includes a processor 310 coupled to a main memory 320 by a bus 330. Main memory 310 may include a volatile random-access-memory (RAM) and be coupled to a memory control hub 340. Memory control hub 340 may also be coupled to bus 330 and to a non-volatile storage device 360. Memory control hub 340 may control the operations of main memory 120 and non-volatile storage device 360. Non-volatile storage device 360 includes a controller 362 and a memory array 364 that work in conjunction to authenticate memory writes and erase operations. Finally, a number of input/output devices 380 such as a keyboard, mouse and/or display may be coupled to bus 330.

Although system 300 is illustrated as a system with a single processor, other embodiments may be implemented with multiple processors, in which additional processors may be coupled to the bus 330. In such cases, each additional processor may share main memory 320 and non-volatile storage device 360 for writing data and/or instructions to and reading data and/or instructions from the same. Also, although non-volatile storage device 360 is shown external to main memory 320, in other embodiments nonvolatile storage device 360 may be part of main memory 320. The embodiments of the invention are not limited in this respect.

System 300 may be any processor-based system including a wired or wireless system. It may be a system which is involved in wireless communications such as a cellular telephone. System 300 may be any of a variety of processor-based systems, including desktop computers, laptops, cellular telephones, digital media players, cameras, communications devices, personal digital assistants, set top boxes, medical equipment, or automotive equipment, to mention a few examples. Processor 310 maybe a microcontroller, one or more microprocessors, or a digital signal processor, to mention a few examples. In one embodiment, the system may be battery powered, but in other embodiments, system 300 may be hard wired to a line power. The architecture shown in FIG. 3 is not meant to be limiting and the present invention may be adapted to any conceivable system architecture.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method comprising:
   generating a private key and a corresponding public key upon system power up;
   storing the corresponding public key in a flash device in said system;
   securing a write operation to the flash device with the private key; and
   wherein the private key and the corresponding public key protect writes to a first block of memory in the flash device and another private key and another corresponding public key, wherein said private key and another private key are different keys, protect writes to a second block of memory in the flash device.

2. The method as recited in claim 1, wherein the flash device uses the corresponding public key to verify the write operation.

3. The method as recited in claim 1, wherein securing the write operation comprises signing the write operation.

4. The method as recited in claim 1, wherein the private key and the corresponding public key comprise a random, non-predictable key pair.

5. The method as recited in claim 1, further comprising:
   generating another private key and another corresponding public key;
   replacing the public key with the other corresponding public key in the memory device; and
   securing another write operation with the other private key.

6. The method as recited in claim 5, wherein the generating the private key and the generating the other private key occur at a predefined time interval.

7. The method as recited in claim 5, wherein the generating the private key and the generating the other private key occur at a random time interval.

8. The method as recited in claim 1, wherein the write operation comprises an update to flash file system data.

9. The method as recited in claim 1, wherein the write operation comprises a write to a block of memory.

10. A system comprising:
a processor to generate a private key and a corresponding public key upon system power up;
a flash device to store the corresponding public key;
an input port from coupled to the processor and the flash device;
wherein the processor further to secure a write operation to the flash device with the private key; and
wherein the private key and the corresponding public key protect writes to a first block of memory in the flash device and another private key, different from said private key, and another corresponding public key protect writes to a second block of memory in the flash device.

11. The system as recited in claim 10, wherein the memory device comprises a controller to use the corresponding public key to verify the write operation.

12. The system as recited in claim 10, wherein the processor signs the write operation to secure the write operation using the private key.

13. The system as recited in claim 10, wherein the private key and the corresponding public key comprise a random, non-predictable key pair.

14. The system as recited in claim 10, wherein the processor is further to generate another private key and another corresponding public key, replace the public key with the other corresponding public key in the memory device, and secure another write operation with the other private key.

15. The system as recited in claim 14, wherein the processor generates the private key and the other private key at a predefined time interval.

16. The system as recited in claim 14, wherein the processor generates the private key and the other private key at a random time interval.

* * * * *